United States Patent
Mwanje et al.

(10) Patent No.: US 11,349,725 B2
(45) Date of Patent: May 31, 2022

(54) METHOD AND APPARATUS FOR PROVIDING COGNITIVE FUNCTIONS AND FACILITATING MANAGEMENT IN COGNITIVE NETWORK MANAGEMENT SYSTEMS

(71) Applicant: NOKIA TECHNOLOGIES OY, Espoo (FI)

(72) Inventors: Stephen Mwanje, Dorfen (DE); Christian Mannweiler, Neubiberg (DE); Lars Christoph Schmelz, Haar (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 290 days.

(21) Appl. No.: 16/329,783

(22) PCT Filed: Sep. 2, 2016

(86) PCT No.: PCT/IB2016/055288
§ 371 (c)(1),
(2) Date: Mar. 1, 2019

(87) PCT Pub. No.: WO2018/042232
PCT Pub. Date: Mar. 8, 2018

(65) Prior Publication Data
US 2019/0273662 A1 Sep. 5, 2019

(51) Int. Cl.
*H04L 41/16* (2022.01)
*H04L 41/0823* (2022.01)
(Continued)

(52) U.S. Cl.
CPC .......... *H04L 41/16* (2013.01); *H04L 41/0823* (2013.01); *H04L 41/145* (2013.01); *H04W 24/02* (2013.01); *H04W 24/10* (2013.01)

(58) Field of Classification Search
CPC ... H04L 41/0823; H04L 41/145; H04L 41/16; H04W 24/02; H04W 24/10
See application file for complete search history.

(56) References Cited

U.S. PATENT DOCUMENTS 7,843,822 B1   11/2010   Paul et al.
8,494,989 B1 *  7/2013   VanDerHorn ......... H04W 24/02
                                                           706/13
(Continued)

FOREIGN PATENT DOCUMENTS

CN    101030882 A    9/2007
JP    2009 206933 A  9/2009
(Continued)

OTHER PUBLICATIONS

Office Action for Japanese Application No. 2019-512206 dated Apr. 1, 2020, 5 pages.
(Continued)

*Primary Examiner* — Normin Abedin
(74) *Attorney, Agent, or Firm* — Alston & Bird LLP

(57) ABSTRACT

Various methods are provided for enabling the application of machine learning to network management and in particular to enabling cognitive network management in radio access networks. One example method may comprise interpreting one or more operator goals for the CNM or for a specific CF to ensure that the specific CF adjusts its behavior in order to fulfil the operator goals, abstracting an environment into states configured for use in subsequent decision making, wherein the abstracted environment represent are built from one or more of a combination of quantitative KPIs, abstract state labels, and operational contexts, defining legal candidate network configurations for different contexts of the CF based on the abstracted environments and operational contexts as inferred by the EMA engine, and matching a current abstract state, abstracted environment, or operational con-
(Continued)

text as derived by the EMA engine to an appropriate network configuration selected from the set of legal candidate network configurations.

20 Claims, 6 Drawing Sheets

(51) Int. Cl.
    *H04L 41/14*     (2022.01)
    *H04W 24/02*     (2009.01)
    *H04W 24/10*     (2009.01)

(56) References Cited

U.S. PATENT DOCUMENTS

2010/0002603 A1     1/2010   Gupta et al.
2016/0205697 A1*   7/2016   Tan ..................... H04W 24/02
                                                                                 370/329

FOREIGN PATENT DOCUMENTS

MX           2011000137 A     2/2011
WO      WO 2012/084763 A1   6/2012
WO      WO 2014/191469 A1   12/2014

OTHER PUBLICATIONS

Office Action for Indian Application No. 201917006712 dated Aug. 20, 2020, 7 pages.
Office Action for Korean Application No. 10-2019-7009522 dated Jan. 28, 2020, 10 pages.
Office Action for Korean Application No. 10-2019-7009522 dated Sep. 8, 2020, 6 pages.
Office Action for Japanese Application No. 2019-512206 dated Nov. 9, 2020, 2 pages.
Office Action for Korean Application No. 10-2019-7009522 dated Nov. 6, 2020, 6 pages.
International Search Report and Written Opinion for Application No. PCT/IB2016/055288 dated May 3, 2018, 15 pages.
Frenzel, C. et al., *Dynamic Context-Specific SON Management Drive by Operator Objectives*, Proceedings of 2014 Network Operations and Management Symposium, Krakow, Poland (2014), 8 pages.
Hahn, S. st al., *Classification of Cells Based on Mobile Network Context*, Proceedings of 5$^{th}$ International Workshop on SON, VTC Spring 2015, Glasgow, United Kingdom, (2015) 5 pages.
Hamalainen, S. et al., (Eds.), *LTE Self-Organising Networks (SON)*, John Wiley & Sons, 2012 398 pages.
He, A. et al., *A Survey of Artificial Intelligence for Cognitive Radios*, IEEE Transactions on Vehicular Technology, vol. 59, No. 4 (May 2010) 1578-1592.
Kuklinski, S. et al., *Application of Cognitive Techniques to Network Management and Control*, <URL: http://link.springer.com/chapter/10.1007%2F978-3-319-07494-8_7>. (dated 2014) v. 288, pp. 79-93 (21 pages).
Lohmuller, S. et al., *Adaptive SON Management Using KPI Measurements*, 2016 IEEE/IFIP Network Operations and Management Symposium, (2016) 625-631.
Mwanje, S. S., *Coordinating Coupled Self-Organized Network Functions in Cellular Radio Networks*, Ph.D. Dissertation, Universitatsbibliothek Technische Universitat Ilmenau, 2015, 157 pages.
Mwanje, S. S. et al., *Concurrent Cooperative Games for Coordinating Son Functions in Cognitive Cellular Networks*, Integrated Network Management (IM), 2015 IFIP/IEEE International Symposium on. IEEE, 2015, p. 1298-1303.
Ojanpera, T. et al., *Cognitive Network Management Framework and Approach for Video Streaming Optimization in Heterogenous Networks*, <URL: http://link.springer.com/article/10.1007/s11277-015-2519-7>. (dated Mar. 18, 2015), 31 pages.
Zorzi, M. et al., *Cognition-Based Networks: A New Perspective on Network Optimization Using Learning and Distributed Intelligence*, IEEE Access, Special Section on Artificial Intelligence Enabled Networking, vol. 3 (2015) 1512-1530.
Office Action for European Application No. 16 767 022.3 dated Mar. 4, 2020, 10 pages.
Office Action from European Patent Application No. 16767022.3, dated Dec. 8, 2020, 17 pages.
Office Action for Chinese Application No. 201680090617.4 dated Aug. 11, 2021, 19 pages.

* cited by examiner

METHOD AND APPARATUS FOR PROVIDING COGNITIVE FUNCTIONS AND FACILITATING MANAGEMENT IN COGNITIVE NETWORK MANAGEMENT SYSTEMS

CROSS-REFERENCE TO RELATED APPLICATIONS

The present application is a national phase entry of International Application No. PCT/IB2016/055288, filed Sep. 2, 2016, which is incorporated herein by reference in its entirety.

TECHNOLOGICAL FIELD

Embodiments described herein generally relate to the application of machine learning to network management. In particular, embodiments described herein relate to Cognitive Network Management (CNM) in radio access networks (for example, 5G or the like) and other, for example, existing or future generations of wireless/mobile networks and, specifically to a method, apparatus, and computer program product for the design of Cognitive Functions (CFs) and associated implementation options with respect to varying levels of centralization or distribution in Cognitive Network Management Systems.

BACKGROUND

Given the use of Self Organizing Networks (SON) and their associated shortcomings in terms of flexibility and adaptability to changing and complex environments, there is demand for more intelligent operations, administration and management (OAM) functions to be added to the networks.

In this regard, areas for improving known and existing conventional and/or existing systems have been identified. Through applied effort, ingenuity, and innovation, solutions to improve such systems have been realized and are described in connection with embodiments of the present invention.

BRIEF SUMMARY

Due to the demand for more intelligent OAM functions to be added to the networks, embodiments described herein, in particular regarding CNM, provide OAM functions enabled to 1) learn the environment in which the functions operate, 2) learn an optimal behavior fitting to the specific environment; 3) learn from experiences and that of other instances of the same or different OAM functions and 4) learn to achieve the higher level goals and objectives as defined by the network operator. This learning may be based on various types of data available in the network, comprising, for example, performance information, failures, configuration data, network planning data, or user, service, and application related data, as well as from the actions and the corresponding impact of the OAM function itself. The learning and the knowledge built from the learned information may then increase the autonomy of the OAM functions.

One aim of the improved system is to reduce the complexity of managing 5G networks or, for example, networks comprising multiple radio access technologies (RATs) with several logical layers within these RATs, operating within many different operational scenarios. Through CFs and CNM, these complex network environments may remain operable from a mobile network operator's (MNO) perspective, with increased efficiency of such network management and through considerably reduced necessity for manual OAM tasks.

Accordingly, embodiments described herein relate to the design of CFs and associated implementation options with respect to varying levels of centralization or distribution in Cognitive Network Management Systems. Embodiments described herein also provide corresponding interface descriptions.

Embodiments of the present invention may provide a cognitive management implementation allowing for the automated adding, deletion, and modification of network states, a direct interpretation of operator goals, the automated modification of management algorithms, and/or management decisions based on knowledge.

Embodiments of the present invention may provide for standard interfaces between the CFs, between sub functions of CNM, and between CFs and the centralized functions of CNM.

Embodiments of the present invention may provide for increased level of automation which is required for improving the operability of mobile networks, in particular 5G networks, and enable the efficient managing of hybrid networks, for example, comprised of virtualized and physical network functions.

In terms of network operability, embodiments described herein may facilitate the offloading of a significant amount of decision making from a human operator to the CNM system. CF behavior, for instance in the event of a legacy SON function, the decision matrices would not have to be adapted manually, rather, this would happen by means of an automated process.

Furthermore, embodiments described herein may provide a clear separation of entities that may be inherent to a CF and therefore enable a clear separation of the tasks that are to be handled by a CF. This separation may allow for a very flexible implementation of CF and therefore a CNM system, and enable the adaptation of a CNM system to various types of network management concepts, approaches and implementations. Despite the fact that CNM primarily targets 5G systems, embodiments described herein enable adaptation of CNM systems to changes in the network and network management architecture.

A method, apparatus and computer program product are therefore provided according to an example embodiment of the present invention for the application of machine learning to network management.

In some embodiments, a system for enabling cognitive network management (CNM) in radio access networks may be provided, the system comprising a network objective manager (NOM), an environment modelling and abstraction (EMA) engine, a configuration management engine (CME), and a decision and action engine (DAE), the NOM comprising at least one processor and at least one memory including computer program code, the at least one memory and the computer program code configured to, with the processor, cause the network objective manager to interpret one or more operator goals for the CNM or for a specific cognitive function (CF) to ensure that the CNM or the specific CF adjusts its behavior in order to fulfil the operator goals, the EMA engine comprising at least one processor and at least one memory including computer program code, the at least one memory and the computer program code configured to, with the processor, cause the environment modelling and abstraction engine to abstract an environment into states configured for use in subsequent decision making, wherein the abstracted environment represent are built from one or more of a combination of quantitative key performance indicators (KPIs), abstract state labels, and operational contexts, the CME comprising at least one processor and at least one memory including computer program code, the at least one memory and the computer program code configured to, with the processor, cause the environment modelling and abstraction engine to define one or more legal candidate network configurations for different contexts of the CF based on the abstracted environments and operational contexts as derived by the EMA engine, the DAE comprising at least one processor and at least one memory including computer program code, the at least one memory and the computer program code configured to, with the processor, cause the decision and action engine to match a current abstract state, abstracted environment, operational context, or combination thereof as derived by the EMA engine to an appropriate network configuration selected from the set of legal candidate network configurations.

In some embodiments, the system may further comprise a coordination engine, the coordination engine comprising at least one processor and at least one memory including computer program code, the at least one memory and the computer program code configured to, with the processor, cause the coordination engine to learn one or more effects of different CF decisions on other CFs, interpret the learned knowledge, and suggest modifications to the CME and DAE to minimize the one or more effects.

In some embodiments, the NOM further comprises computer program code configured to, with the processor, cause the apparatus to receive one or more key quality indicators (KQI) inputs, and provide weighted or prioritized KPI targets.

In some embodiments, the EMA engine is implemented as a classifier configured to cluster KPIs or combinations of KPIs into sets that are logically distinguishable from each other. In some embodiments, the CME is implemented as a supervised learning agent applying a Neural Network, a Support Vector Machine, or other learning algorithm that evaluates historical data indicative of a quality of different configurations in terms of achieving the defined KPI targets in different contexts to select the legal configurations.

In some embodiments, the DAE further comprises computer program code configured to, with the processor, cause the apparatus to learn a quality of different network configurations in different contexts as defined by the EMA, from an application of the legal network configurations and towards different operator objectives, and subsequently, select an optimal network configuration for the network context and state. In some embodiments, the DAE is implemented as a single objective RL agent, wherein the single objective is optimizing the CF requirements, the CF requirements comprising one or more targets for different technical objectives or KPIs.

In some embodiments, the system further comprises a first interface, the first interface configured provide the KPI targets expected to be achieved by the CFs and additional information indicative of how the targets are to be interpreted, the additional information comprising one or more of weights, priorities or utilities of the KPIs. In some embodiments, the system further comprises a second interface, the second interface configured to provide a connection between the EMA and one or more of the CE, the CME, and the DAE, and provide the abstract environment states or contexts as created by the EMA.

In some embodiments, the system further comprises a third interface, the third interface configured to provide a connection between the CE and the CME, and provide rules derived by the CE concerning the configuration of a specific CF. In some embodiments, the system further comprises a fourth interface, the fourth interface configured to provide a connection between the CE and the DAE, and provide the set of legal network configurations.

In some embodiments, the system further comprises a fifth interface, the fifth interface configured to provide a connection between the DAE and the EMA, and carry the current network configurations as selected by the DAE. In some embodiments, the system further comprises a fifth interface, the fifth interface configured to provide a connection between the DAE and one or more of the CME and the CE, and carry the report of current network configurations and related KPI measurements.

In some embodiments, a method for enabling cognitive network management (CNM) in radio access networks may be provided, the method comprising utilizing a network objective manager (NOM), an environment modelling and abstraction (EMA) engine, a configuration management engine (CME), and a decision and action engine (DAE), interpreting, by the NOM, one or more operator goals for the CNM or for a specific cognitive function (CF) to ensure that the CNM or the specific CF adjusts its behavior in order to fulfil the operator goals, abstracting, by the EMA engine, an environment into states configured for use in subsequent decision making, wherein the abstracted environment represent are built from one or more of a combination of quantitative key performance indicators (KPIs), abstract state labels, and operational contexts, defining, by the CME, one or more legal candidate network configurations for different contexts of the CF based on the abstracted environments and operational contexts as derived by the EMA engine, matching, by the DAE, a current abstract state, abstracted environment, operational context, or combination thereof as derived by the EMA engine to an appropriate network configuration selected from the set of legal candidate network configurations.

In some embodiments, the method may further comprise utilizing a coordination engine, learning, by the coordination engine, one or more effects of different CF decisions on other CFs, interpreting the learned knowledge, and suggesting modifications to the CME and DAE to minimize the one or more effects. In some embodiments, the method may further comprise receiving, at the NOM, one or more key quality indicators (KQI) inputs, and providing, by the NOM, weighted or prioritized KPI targets.

In some embodiments, the EMA engine is implemented as a classifier configured to cluster KPIs or combinations of KPIs into sets that are logically distinguishable from each other. In some embodiments, the CME is implemented as a supervised learning agent applying a Neural Network, a Support Vector Machine, or other learning algorithm that evaluates historical data indicative of a quality of different configurations in terms of achieving the defined KPI targets in different contexts to select the legal configurations.

In some embodiments, the method may further comprise learning, by the DAE, a quality of different network configurations in different contexts as defined by the EMA, from an application of the legal network configurations and towards different operator objectives, and subsequently, select an optimal network configuration for the network context and state. In some embodiments, the DAE is implemented as a single objective RL agent, wherein the single objective is optimizing the CF requirements, the CF requirements comprising one or more targets for different technical objectives or KPIs.

In some embodiments, the method may further comprise providing a first interface, the first interface configured provide the KPI targets expected to be achieved by the CFs and additional information indicative of how the targets are to be interpreted, the additional information comprising one or more of weights, priorities or utilities of the KPIs. In some embodiments, the method may further comprise utilizing a second interface, the second interface configured to provide a connection between the EMA and one or more of the CE, the CME, and the DAE, and provide the abstract environment states or contexts as created by the EMA.

In some embodiments, the method may further comprise utilizing a third interface, the third interface configured to provide a connection between the CE and the CME, and provide rules derived by the CE concerning the configuration of a specific CF. In some embodiments, the method may further comprise utilizing a fourth interface, the fourth interface configured to provide a connection between the CE and the DAE, and provide the set of legal network configurations.

In some embodiments, the method may further comprise utilizing a fifth interface, the fifth interface configured to provide a connection between the DAE and the EMA, and carry the current network configurations as selected by the DAE. In some embodiments, the method may further comprise utilizing a fifth interface, the fifth interface configured to provide a connection between the DAE and one or more of the CME and the CE, and carry the report of current network configurations and related KPI measurements.

In some embodiments, computer program product for enabling cognitive network management (CNM) in radio access networks may be provided, the computer program product comprising at least one non-transitory computer-readable storage medium having computer-executable program code instructions stored therein, the computer-executable program code instructions comprising program code instructions for utilizing a network objective manager (NOM), an environment modelling and abstraction (EMA) engine, a configuration management engine (CME), and a decision and action engine (DAE), interpreting, by the NOM, one or more operator goals for the CNM or for a specific cognitive function (CF) to ensure that the CNM or the specific CF adjusts its behavior in order to fulfil the operator goals, abstracting, by the EMA engine, an environment into states configured for use in subsequent decision making, wherein the abstracted environment represent are built from one or more of a combination of quantitative key performance indicators (KPIs), abstract state labels, and operational contexts, defining, by the CME, one or more legal candidate network configurations for different contexts of the CF based on the abstracted environments and operational contexts as derived by the EMA engine, and matching, by the DAE, a current abstract state, abstracted environment, operational context, or combination thereof as derived by the EMA engine to an appropriate network configuration selected from the set of legal candidate network configurations.

In some embodiments, the computer-executable program code instructions further comprise program code instructions for utilizing a coordination engine, learning, by the coordination engine, one or more effects of different CF decisions on other CFs, interpreting the learned knowledge, and suggesting modifications to the CME and DAE to minimize the one or more effects. In some embodiments, the computer-executable program code instructions further comprise program code instructions for receiving, at the NOM, one or more key quality indicators (KQI) inputs, and providing, by the NOM, weighted or prioritized KPI targets.

In some embodiments, the EMA engine is implemented as a classifier configured to cluster KPIs or combinations of KPIs into sets that are logically distinguishable from each other. In some embodiments, the CME is implemented as a supervised learning agent applying a Neural Network, a Support Vector Machine, or other learning algorithm that evaluates historical data indicative of a quality of different configurations in terms of achieving the defined KPI targets in different contexts to select the legal configurations.

In some embodiments, the computer-executable program code instructions further comprise program code instructions for learning, by the DAE, a quality of different network configurations in different contexts as defined by the EMA, from an application of the legal network configurations and towards different operator objectives, and subsequently, select an optimal network configuration for the network context and state. In some embodiments, the DAE is implemented as a single objective RL agent, wherein the single objective is optimizing the CF requirements, the CF requirements comprising one or more targets for different technical objectives or KPIs.

In some embodiments, the computer-executable program code instructions further comprise program code instructions for utilizing a first interface, the first interface configured provide the KPI targets expected to be achieved by the CFs and additional information indicative of how the targets are to be interpreted, the additional information comprising one or more of weights, priorities or utilities of the KPIs. In some embodiments, the computer-executable program code instructions further comprise program code instructions for utilizing a second interface, the second interface configured to provide a connection between the EMA and one or more of the CE, the CME, and the DAE, and provide the abstract environment states or contexts as created by the EMA.

In some embodiments, the computer-executable program code instructions further comprise program code instructions for utilizing a third interface, the third interface configured to provide a connection between the CE and the CME, and provide rules derived by the CE concerning the configuration of a specific CF. In some embodiments, the computer-executable program code instructions further comprise program code instructions for utilizing a fourth interface, the fourth interface configured to provide a connection between the CE and the DAE, and provide the set of legal network configurations. In some embodiments, the computer-executable program code instructions further comprise program code instructions for utilizing a fifth interface, the fifth interface configured to provide a connection between the DAE and the EMA, and carry the current network configurations as selected by the DAE. In some embodiments, the computer-executable program code instructions further comprise program code instructions for utilizing a fifth interface, the fifth interface configured to provide a connection between the DAE and one or more of the CME and the CE, and carry the report of current network configurations and related KPI measurements.

BRIEF DESCRIPTION OF THE DRAWINGS

Figure 1:
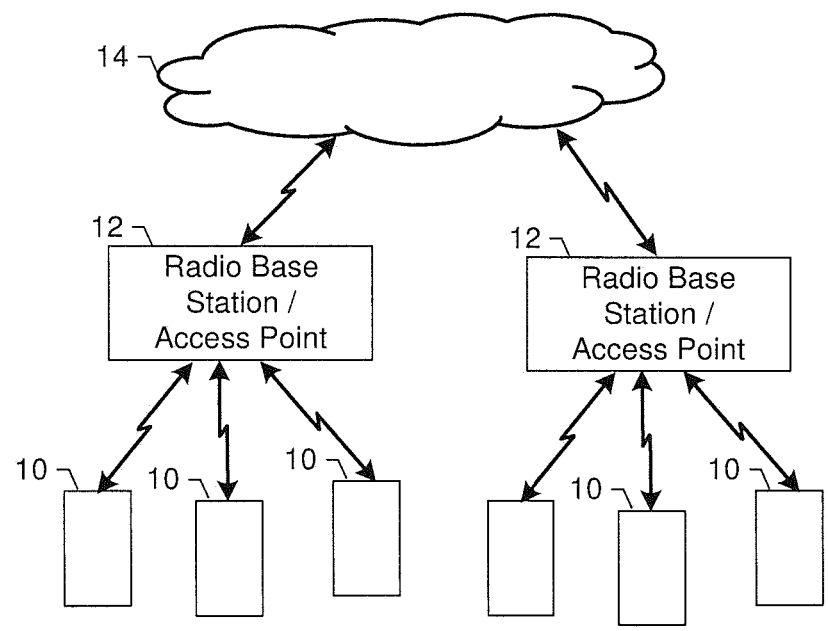
Figure 2:
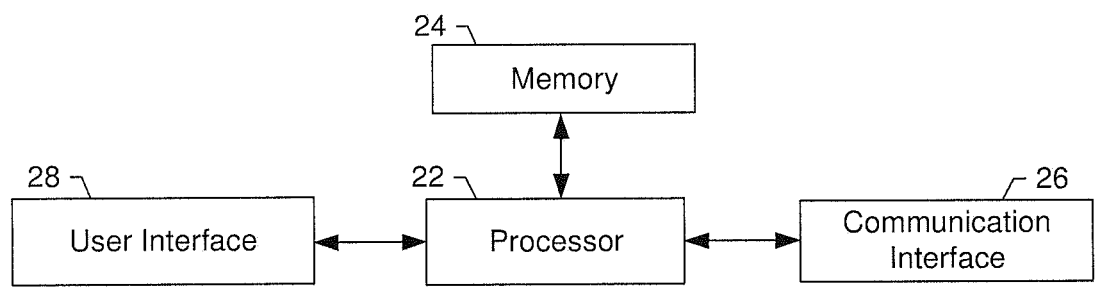
Figure 3:
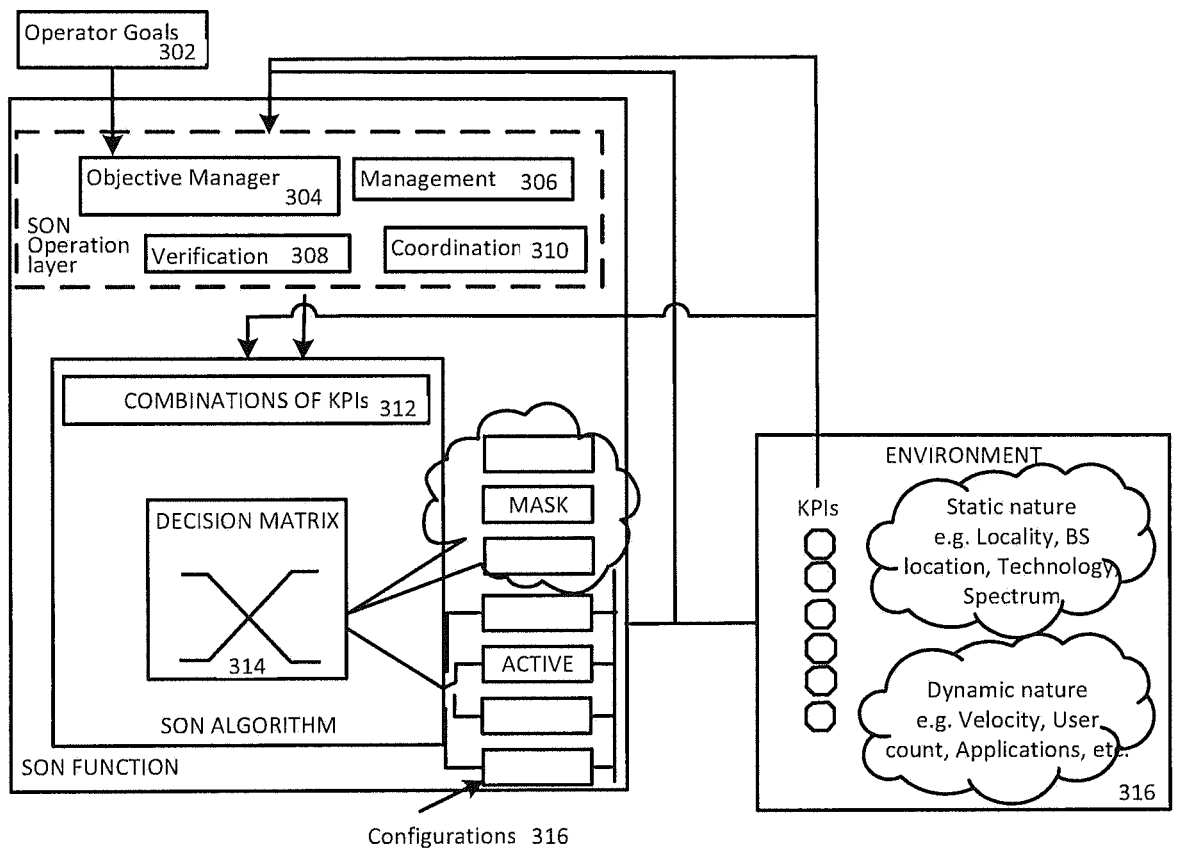
Figure 4:
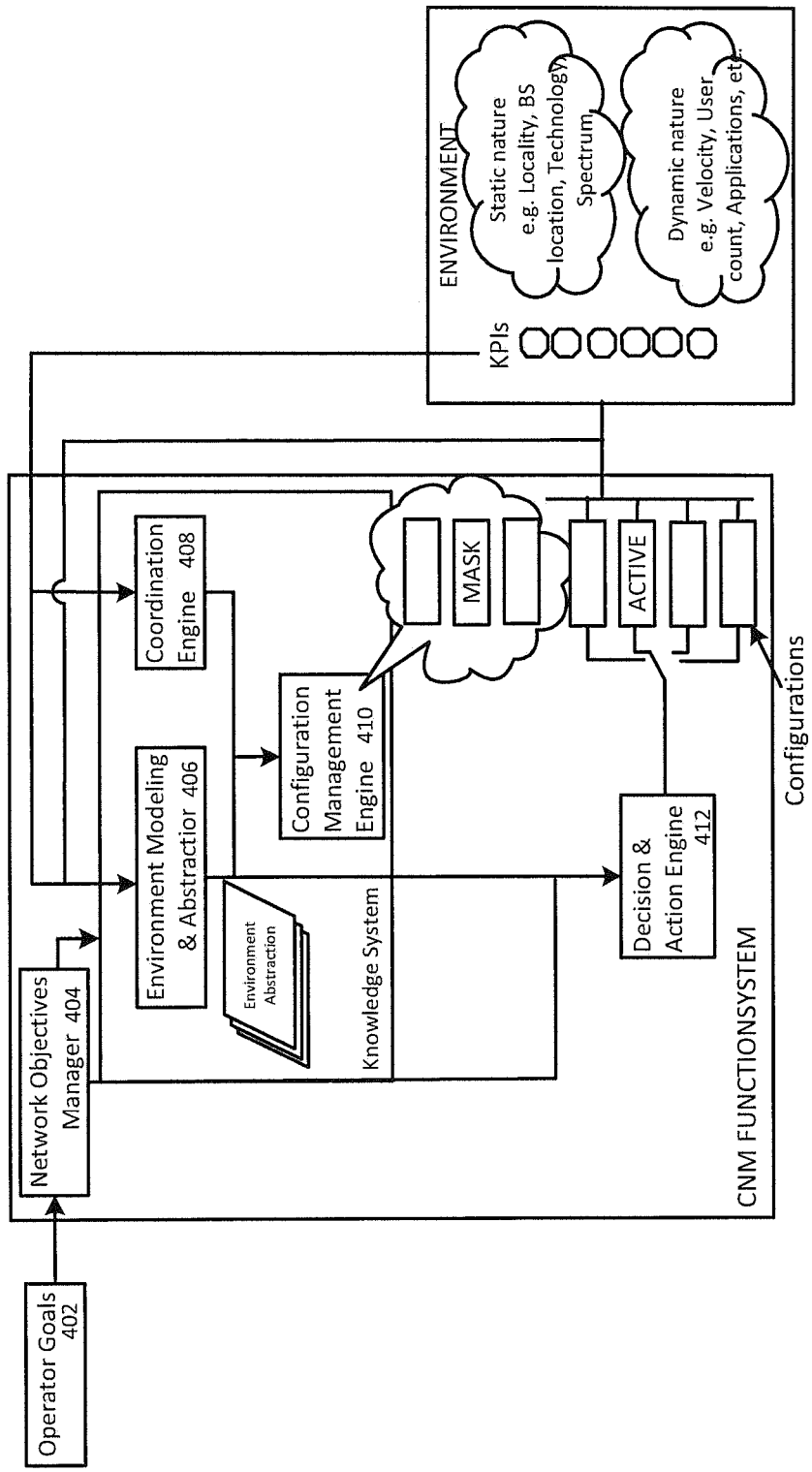
Figure 5:
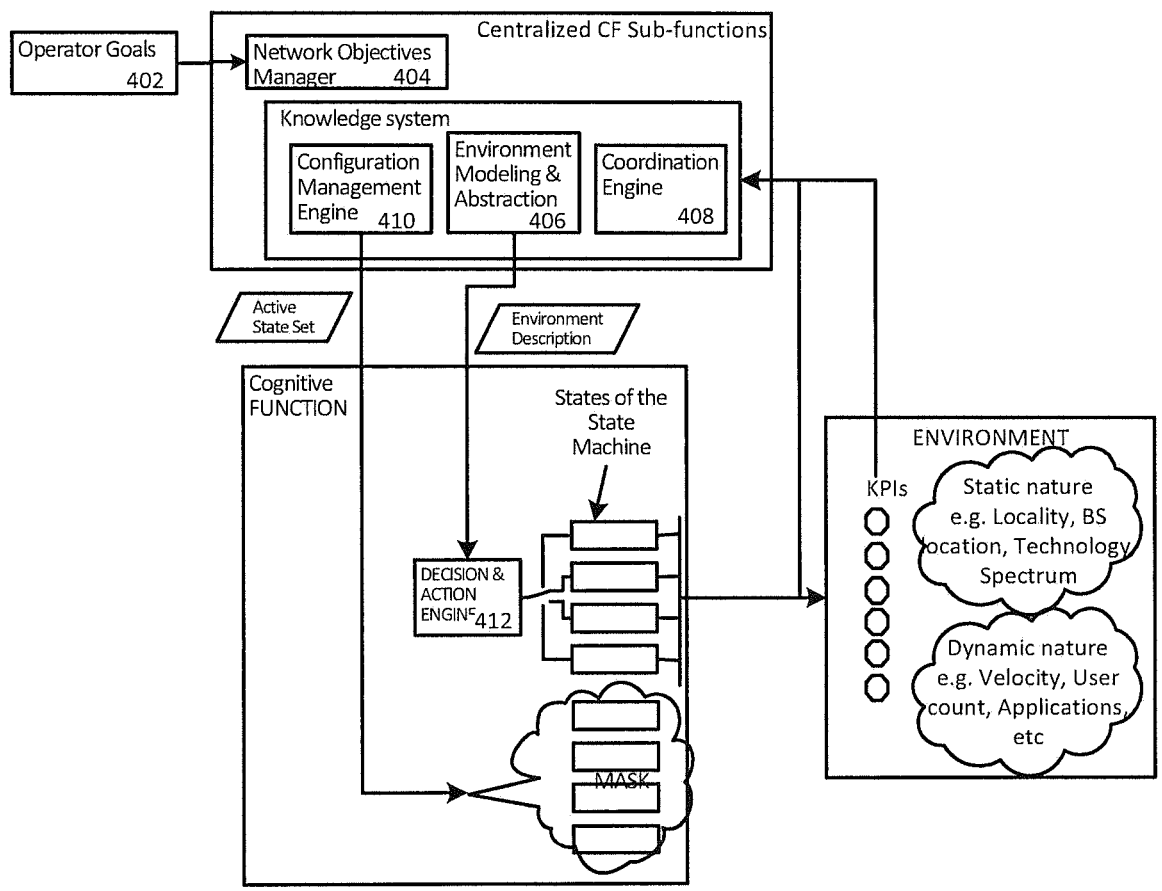
Figure 6:
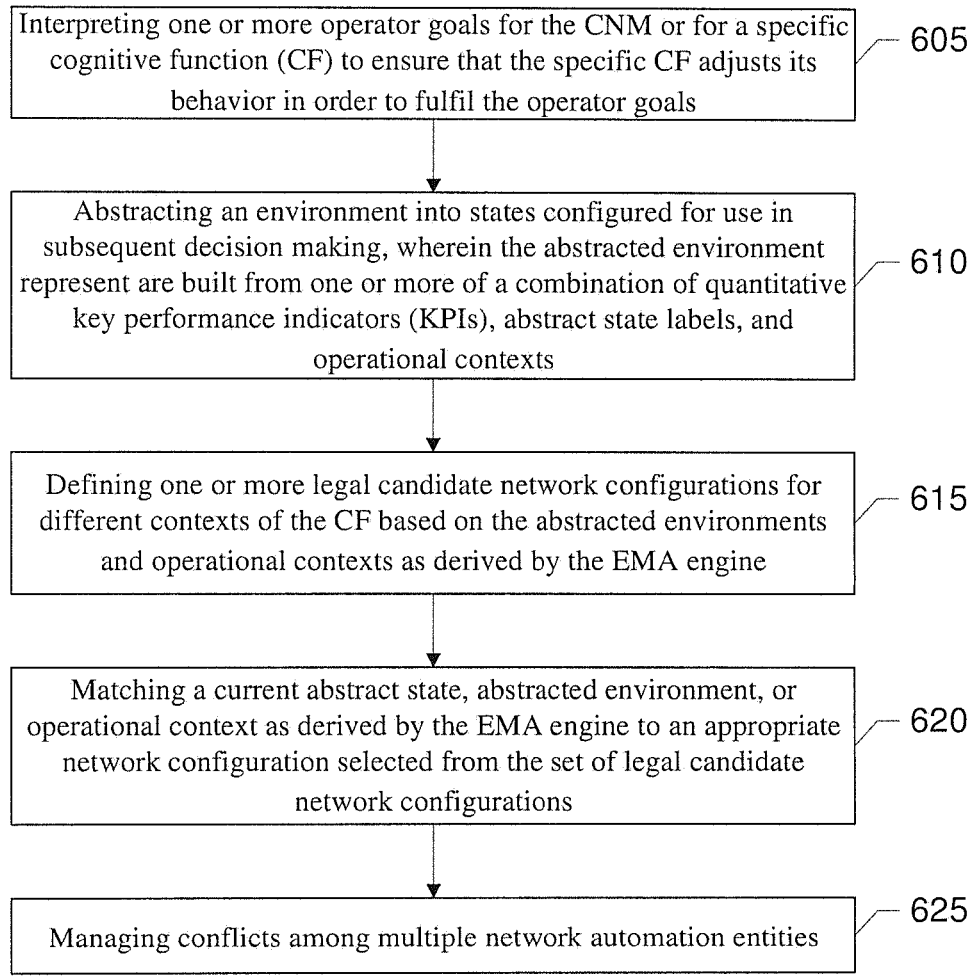
Figure 7:
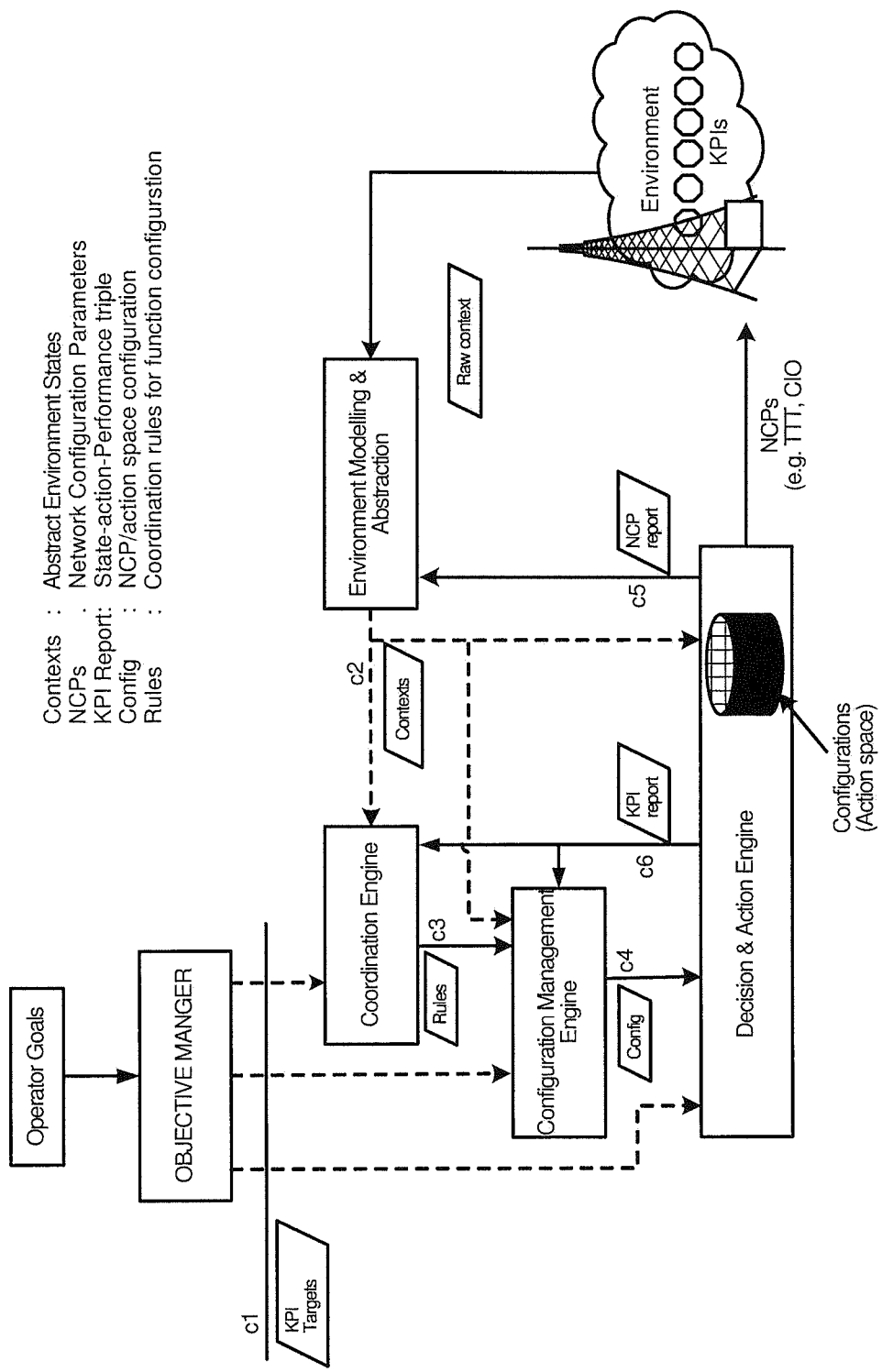

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is block diagram of a system that may be specifically configured in accordance with an example embodiment of the present invention;

FIG. 4 is block diagram of a system that may be specifically configured in accordance with an example embodiment of the present invention;

FIG. 5 is block diagram of a system that may be specifically configured in accordance with an example embodiment of the present invention;

FIG. 6 is a flowchart showing an exemplary method of operating an example apparatus in accordance with an embodiment of the present invention; and FIG. 7 is block diagram of a system that may be specifically configured in accordance with an example embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

System Architecture

Referring now to FIG. 1, which illustrates an example system that supports communications between a plurality of stations 10 and one or more radio base stations/access points 12 (for example, a high density system scenario where a plurality of radio base stations/access points may be deployed to a geographical area and may be operating on the same frequency channel), each radio base station/access point may communicate with one or more stations and, in one embodiment, may communicate with a large number of stations, such as 6,000 or more stations. The radio base stations/access points may, in turn, communicate with a network 14. While the radio base stations/access points may communicate via 5G, an Long Term Evolution (LTE) or LTE-Advanced (LTE-A) network, other networks may support communications between the access points including those configured in accordance with wideband code division multiple access (W-CDMA), CDMA2000, global system for mobile communications (GSM), general packet radio service (GPRS), the IEEE 802.11 standard including, for example, the IEEE 802.11ah or 802.11ac standard or other newer amendments of the standard, wireless local access network (WLAN), Worldwide Interoperability for Microwave Access (WiMAX) protocols, universal mobile telecommunications systems (UMTS) terrestrial radio access network (UTRAN) and/or the like, as well as other standards, for example, with respect to multi-domain networks, that may include, industrial wireless communication networks such as WirelessHART, Bluetooth, ZigBee etc. and/or the like.

The radio base stations/access points 12 and the stations 10 may communicate via wireline communications, but most commonly communicate via wireless communications. For example, the radio base stations/access points and the stations may communicate in a sub 1 GHz band as defined by IEEE 802.11ah standard or in a 5 GHz band, which may be defined by, for example, IEEE 802.11ac standard. The radio base station/access point may be embodied by any of a variety of network entities, such as an access point, a base station, a Node B, an evolved Node B (eNB), a radio network controller (RNC), a mobile device/a station (for example, mobile telephones, smart phones, portable digital assistants (PDAs), pagers, laptop computers, tablet computers or any of numerous other hand held or portable communication devices, computation devices, content generation devices, content consumption devices, or combinations thereof), or the like. The stations may also be embodied by a variety of devices, such as sensors, meters or the like. The sensors and meters may be deployed in a variety of different applications including in utility applications to serve as a gas meter, a water meter, a power meter or the like, in environmental and/or agricultural monitoring applications, in industrial process automation applications, vehicular or transportation automation application, in healthcare and fitness applications, in building automation and control applications and/or in temperature sensing applications. Stations that are embodied by sensors or meters may be utilized in some embodiments to backhaul sensor and meter data. Alternatively, the stations may be embodied by mobile terminals or user equipment(s) (UE), such as mobile communication devices, for example, mobile telephones, smart phones, portable digital assistants (PDAs), pagers, laptop computers, tablet computers or any of numerous other hand held or portable communication devices, computation devices, content generation devices, content consumption devices, or combinations thereof. In an embodiment in which the station is embodied by a mobile terminal, the communication between an access point and the station may serve to extend the range of wi-fi or another wireless local area network (WLAN), such as by extending the range of a hotspot, and to offload traffic that otherwise would be carried by a cellular or other network.

The radio base station/access point 12 and/or the station 10 may be embodied as or otherwise include an apparatus 20 that is specifically configured to perform the functions of the respective device, as generically represented by the block diagram of FIG. 2. While the apparatus may be employed, for example, by a radio base station/access point or a station, it should be noted that the components, devices or elements described below may not be mandatory and thus some may be omitted in certain embodiments. Additionally, some embodiments may include further or different components, devices or elements beyond those shown and described herein.

Apparatus Architecture

Regardless of the type of device that embodies the radio base station/access point 12 and/or the station 10, the radio base station/access point 12 and/or the station 10 may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (for example, near-eye-display), in the air, etc. The user interface may also be in communication with the memory 24 and/or the communication interface 26, such as via a bus.

Self-Organizing Networks

Self-Organizing Networks provides a solution in which each problem is addressed by a single SON function, and a single SON function may address multiple problems. The function is a closed control loop algorithm that acquires data from the network and uses the measurements contained in this data to determine or compute new configuration values for the network (element) (in the following denominated as "network configurations") according to a set of algorithm internal rules or policies. In other words, the function is a state machine that matches inputs (network key performance indicators (KPI)s) to outputs (network configurations). It has fixed behavior in that its input-output relationship or the path thereto is predesigned into the solution through the rules (for example, states and state transitions) of the algorithm. Management and coordination of multiple SON functions is performed in a hierarchical manner, for example, SON coordination and management may be performed by (non-cognitive) centralized functions according to rather fixed rules, or through policies that are created based on fixed rules and input from MNO and SON manufacturer.

FIG. 3 is block diagram of a system utilizing a typical SON solution. SON may operate (as may CNM) in an environment 316 characterized by invisible, non-modeled static and dynamic characteristics that influence a defined set of KPIs. Within SON, the SON functions have a limited view on the environment, and need an external SON management that takes this view for them. Furthermore, this SON management only knows about pre-defined types of context, but cannot detect new ones. Consequently, by relying only on KPIs, as is the case with SON, the performance may be limited to how much the KPIs accurately measure and abstract the environment. CNM takes the next step beyond this approach and infers more about the environment than just reading the KPIs. That is, CNM allows the CFs to detect within which context and in which environment the CFs work and to identify potential new context or a new environment. The same counts for services requirements etc.

Each SON solution may implement a decision matrix 314 that matches combinations of KPIs 312 to network configurations 316 (which can also be considered as function-internal states of the state machine). In this case, the network configuration, which is the output of the SON algorithm, is a particular combination of Network Configuration Parameters (NCPs). The function may consider the current network configuration as input to the decision making process but it always has only one network configuration active at any one time, chosen from a limited set of possible network configurations.

The designer may however chose to decouple some system-wide functionality, such as coordination 310 and verification 308, from the SON function itself and into a SON operation layer.

In particular, since the same subset of NCPs may be subject to re-configuration triggered by different SON functions (for example, both Mobility Robustness Optimization, MRO and Mobility Load Balancing, MLB configure Cell-Individual Offset, CIO), decisions of SON functions may need to be coordinated on logically centralized level.

Cognitive Network Management

Embodiments described herein provide a design of a Cognitive function (CF) blueprint for intelligent network management functions that overcomes the challenges and shortcomings of SON stated above and meets the CNM requirements (for example, learning from history in and for different operating contexts in order to enable optimal response for each context).

As described herein, the work done by an intelligent network management function is decomposed and where and how cognition can be added is described, for example, so as to achieve a cognitive function. "Active testing" benefits that are inherent in machine learning are leveraged. Active testing may ensure that a CF does not only check for more optimal settings based on learning, but may also try settings that have not been previously used in order to enhance the knowledge space/domain. Such may be inherent in machine learning since gaining knowledge may require the CF to execute configurations that are not known so as to analyze and evaluate how good or bad those functions perform in a given context.

FIG. 4 shows a block diagram of a system that may be configured in accordance with an example embodiment of the present invention, and in particular, shows the decomposition presented from the perspective of the CF, for example, to show what is needed to achieve CNM, while the system-wide perspective is described in the implementation. The proposed decomposition comprises five major components: "Network Objectives Manager" 404, "Environment Modelling & Abstraction" 406, "Configuration Management Engine" 410, "Decision & Action Engine" 412 and "Coordination Engine" 408.

The cognitive function (CF) operates in the same environment as SON functions, however, the CF deals with the limited environment representation of KPIs differently. Instead of finding network configurations that influence particular KPIs, the CF may be configured to generate or otherwise make inferences regarding the existing KPIs in combination with additional other network data like counters, timers, alarms, measurements, context data and the prevailing network configuration as well as the set operator objectives to adjust its behavior in line with the inferences and goals.

1. Network Objectives Manager

According to some example embodiments, a Network Objectives Manager (NOM) 404 interprets operator goals 402 for the CNM, network or for the specific Cognitive function (CF) to ensure that the cognitive function(s) adjust its/their behavior in order to fulfil the goals. The interpretation is taken as input to the other blocks that then accordingly adjust their internal structures and subsequently their behavior.

In principle, the CNM and the Cognitive function (CF)s need to be configured with the desired KPI targets and their relative importance, which the CFs then attempt to achieve through learning the effects of different network configurations. Without the NOM, such targets would be manually set by the operator who analyses the overall business and technical goals (or Key Quality Indicators (KQIs) to derive the network KPI targets and their relative priorities.

In this design, the NOM 404 replaces this manual operation by breaking down the input KQIs into the output which are the weighted/prioritized KPI targets. Note that the input (operator goals or KQIs) usually are at a different level of abstraction compared to the outputs.

2. Environment Modelling & Abstraction

According to some example embodiments, an Environment Modelling & Abstraction (EMA) engine 406 abstracts the environment into states which are used for subsequent decision making. Such environment abstractions that represent different contexts and situations in which the CF operates may, for example, be built from different combinations of quantitative KPIs, abstract (semantic) state labels, and operational contexts, for example, current network or network element configurations.

The CF uses the EMA engine 406 to create new or change (for example, modify, split, delete, or the like) existing quantitative or abstract external states as and when needed. These abstract states are then used by the further CF sub-functions—the Decision & Action Engine (DAE) 412 and the Configuration Management Engine (CME) 410.

As an optional extension, the receiving entities (for example, CME, DAE) may specify which KPIs, which frequency of updates, and which level of abstraction they actually require.

3. Configuration Management Engine

According to some example embodiments, a Configuration Management Engine (CME) 410 defines and refines the legal candidate network configurations for the different contexts of the CF based on the abstractions of the environment and operational contexts as inferred by the EMA engine.

In the simplest form, the CME 410 masks some network configurations out of the set of all possible network configurations as being unnecessary or unreachable in light of current abstracted environment states. In that case, the set of possible network configurations is fixed and the CME only selects from within this fixed set.

In a more cognitive behavior, the CME 410 may, however, also be able to add, remove or modify (for example, split or combine) the network configurations based on the learnings of how or if the network configurations are useful.

4. Decision & Action Engine

According to some example embodiments, a Decision Action Engine (DAE) 412 matches the current abstract state (for example, the environment and operational context as derived by the EMA engine) to the appropriate network configuration selected from the set of legal or acceptable candidate network configurations. The DAE 412 has the logic to search through or reason over the candidate network configurations to select the most appropriate one for the current state that achieves the CF's set objectives.

In the SON paradigm, such an engine was the core of the SON function and the selected network configurations were based on a preset set of rules (usually an underlying static decision/mapping matrix). In a CF, such an engine learns 1) the quality of different network configurations 2) in different contexts (as defined by the EMA) 3) from the application of the different legal network configurations and 4) towards different operator objectives. It may then select the optimal network configuration for the different network contexts and states. Therefore, the mapping process (current abstract state to network configuration) becomes more dynamic and adaptive.

To achieve this, the internal state of the DAE (for example, the equivalent of a static mapping matrix within a SON function) must also be able to change. Since there are no rules (to be changed) in this framework, we can imagine changes in the DAE internal states (and transitions) through the learning. For example, in an approach based on neural networks as a set of neurons with multitudes of connections among them, neurons can fire, and connections get activated depending on the context and objectives so as to select the optimal configurations.

5. Coordination Engine

To manage conflicts among multiple network automation entities, the concept of SON coordination was introduced as part of SON. Similarly, the CNM paradigm also requires a coordination function albeit a different kind of coordination compared to legacy SON coordination. Since the CFs will be learning and improving their performance over time, the coordination engine has to be smart enough to coordinate these learning functions whose behavior is non-deterministic owing to the learning.

In some embodiments, specific activities of the CE may comprise (i) detection and resolving of possibly conflicting network configurations set by the different CFs, (ii) (for selected cases) defining the rules for "last track" peer-to-peer coordination among CFs without involvement of the central Coordination Engine, (iii) enabling cross-domain (multiple network domains, multiple networks, multiple operators) knowledge and information sharing, including environment and network modeling, relevance and performance of KPIs and CF configurations in different contexts, as well as cross-domain application of cognitive algorithms, and (iv) supporting other sub-functions of the Knowledge Management subsystem (described below) by means of identifying CFs with similar context in terms of environment state and active configuration sets.

Knowledge Management

Together, the EMA, the CME and the CE can be considered as a knowledge management system since they put together the knowledge/context used by the DAE to select the optimal configurations.

Exceptions

Note that the design described herein precludes some of the functions that were needed in legacy SON. For example, since each CF applies and learns from its interaction with the network, a verification function (at least on the CF's objectives) may become obsolete as the functions may be verified and learned to avoid the network configurations that result in suboptimal performance. Also, the classical SON coordination and SON management are not fully applicable to the proposed design.

Implementation and Operation

In an example embodiment of the present invention, an apparatus or computer program product may be provided to implement or execute a method, process, or algorithm for facilitating the application of machine learning to network management.

FIG. 6 show a flowchart of the exemplary operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (for example, hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 6 when executed, converts a computer or processing circuitry into a particular machine configured to perform an example embodiment of the present invention. Accordingly, the operations of FIG. 6 defines an algorithm for configuring a computer or processing to perform an example embodiment. In some cases, a general purpose computer may be provided with an instance of the processor which performs the algorithms of FIG. 6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included as shown by the blocks having a dashed outline in FIG. 6. It should be appreciated that each of the modifications, optional additions or amplifications below may be included with the operations above either alone or in combination with any others among the features described herein.

Implementation

In some embodiments, neither a fully distributed nor a fully centralized implementation for CNM may be feasible, since some of the CNM components may work across multiple CFs, while others need to be located within the network element especially close to the NCPs.

The structure as presented in FIG. 4 fits a feasible "distributed" solution, or a hybrid solution, which implements the NOM in a centralized OAM system and the rest in the network element. Alternatively, a centralized solution, which may also be considered a hybrid solution, implements only the DAE 412 in the network element and places all the other components at the level of the centralized OAM system as shown in FIG. 5.

Some components (for example, the EMA 406, CME 410, or CE 408) may be moved back and forth between distributed CFs and the centralized management layer. For example, a function-specific CME 410 may learn and create the legal candidate network configurations for only a single CF based on the performance of the network configurations towards the CF's objectives and in consideration of the cross effects of the CF on and from other CFs. On the other hand, a centralized CME 410 may also be possible and beneficial since such a CME 410 may, based on the cross functional view, set legal network configurations in a way that CFs may have insignificant (or preferably no) cross effects on each other.

As stated, the design of FIG. 5 allows for a flexible work split between the local and the centralized components of CFs. In general, any combination of distributed and centralized design is possible, for example, instead of centralizing all three sub-functions of the knowledge system, only a subset of them can be centralized, for example, only EMA 406 and/or the CE 408. Regardless of the implementation, however, the according interfaces between these functions would be maintained in order to allow for a (standardized) exchange of data.

Operation

In some example embodiments, a method, apparatus and computer program product may be configured for facilitating the application of machine learning to network management. FIG. 5 is a flowchart showing an exemplary method of operating an example apparatus in accordance with an embodiment of the present invention.

Network Objectives Manager

As shown in block 505 of FIG. 5, an apparatus, such as a Network Objectives Manager 404, apparatus 20 embodied by the computing device 10, or the like, may be configured to interpret operator goals for the CNM or for a specific Cognitive function (CF) to ensure that the specific CF adjusts its behavior in order to fulfil the goals. The apparatus such as a Network Objectives Manager 404, apparatus 20 embodied by the computing device 10, or the like may therefore include means, such as the processor 22, the communication interface 26 or the like, for interpreting operator goals for the CNM, network or for a specific CF to ensure that the specific CF adjusts, for example, a behavior in order to fulfil the operator goals.

Environment Modelling & Abstraction (EMA)

As shown in block 510 of FIG. 5, an apparatus, such as an Environment Modelling & Abstraction Engine 406, apparatus 20 embodied by the computing device 10, or the like may be configured to abstract the environment into states which are used for subsequent decision making. The apparatus such as an Environment Modelling & Abstraction Engine 406, apparatus 20 embodied by the computing device 10, or the like may therefore include means, such as the processor 22, the communication interface 26 or the like, for abstracting the environment into states which are used for subsequent decision making. In some embodiments, the environment abstractions that represent different contexts and situations in which the CF operates are built from different combinations of quantitative KPIs, abstract (semantic) state labels, and operational contexts (for example, current network or network element configurations).

In some embodiments, EMA engine 406 may be implemented as a classifier, for example, that clusters KPIs or combinations of KPIs into sets that are logically distinguishable from each other. Such a classifier may apply a Neural Network, a Support Vector Machine or similar learning algorithms to mine through historical KPIs and mark out logical groupings of the KPIs. Each such a group would represent a particular abstraction of the environment that requires a specific configuration. Note however, that an advanced version of the EMA may add a RL agent that selects the appropriate abstractions for each CF and (preferably) reclassifies them for the specific CF.

A centralized modeling of the network and the environment may provide the advantage of working with a broader data set (network performance information/KPIs, measurements, context, etc.). While individual CFs can only have a limited view of the network and other context information, a centralized EMA Engine may collect data across a defined network domain. This does not mean that it provides KPIs with the same level of abstraction to all cognitive functions. Rather, depending on the CF and its feedback regarding the provided operational KPIs and environment description, the EMA may dynamically adapt/change its output towards the CFs. Generally, this can range across multiple levels of measurements, from ratio-scale KPIs to interval-scale metrics to semantically enriched nominal-scale state descriptions. Further, the level of precision and accuracy may be modified dynamically.

Configuration Management Engine (CME)

According to some example embodiments, a Configuration Management Engine (CME) 410 is a multi-input multi-objective learning agent getting input from the EMA 406 and CE 408 to determine the appropriate list of legal/acceptable configurations candidates. CME 410 learns to set configurations that will enable fast solution computation but that will also be accurate and effective for the CF's objective(s), the operator's objectives, as well as the CE 408 requirements/commands.

In some embodiments, CME 410 may be implemented as a supervised learning agent (applying a Neural Network, a Support Vector Machine or similar learning algorithm) that evaluates historical data about the quality of different configurations in different contexts (environmental states, peer functions, etc.) to select the legal configurations.

However, an online version of the CME 410 may apply RL to continuously adjust the legal configuration set as different configurations are applied to the network and their performance evaluated.

A centralized CME 410 may be configured to manage the internal state space for all CFs by continuously monitoring and updating (modify, split, delete, etc.) the set of possible (legal) network configurations available for each CF. Again, the advantage of such a centralized approach consists of taking more informed decisions due to a broader data set and sharing state space modeling knowledge across multiple CFs. However, to manage scalability, for example, in case of many different CFs being implemented in the system, a centralized CME 410 may only manage network configuration sets for CF and not for CF instances. In that case final granularity for the specific CF instances will be left to the DAE 412 decisions/learning for each instance.

As such, as shown in block 515 of FIG. 5, an apparatus, such as a Configuration Management Engine 410, apparatus 20 embodied by the computing device 10, or the like may be configured to define and/or refine the legal candidate network configurations for the different contexts of the CF based on the abstractions of the environment and operational contexts as inferred by the EMA engine. The apparatus such as a Configuration Management Engine 410, apparatus 20 embodied by the computing device 10, or the like may therefore include means, such as the processor 22, the communication interface 26 or the like, for defining and refining the legal candidate network configurations for the different contexts of the CF based on the abstractions of the environment and operational contexts as inferred by the EMA engine.

Decision & Action Engine (DAE)

According to some example embodiments, a Decision & Action Engine (DAE) 412 may be a single input-output, single objective agent that learns the best network configurations for specific abstract states and the specific CF's own objective(s). In some embodiments, DAE 412 may be implemented as a single objective RL agent since the learning has to take place online. Note that the single objective in this case is optimizing the CF's requirements which may in fact consist of multiple targets for different technical objectives or KPIs. For example, the single objective may be optimizing mobility performance which then translates into the multiple technical objectives of minimizing radio link failures while simultaneously minimizing handover oscillations. Meanwhile, since it may not always be possible to have specific network configurations that perfectly match specific contexts, fuzzy logic may need to be applied on top of the RL to allow for a further degree of flexibility in the selected network configurations.

In many use cases, DAE 412 may be distributed (for example, implemented at the network element, such as, the base station) to allow for much more frequent optimizations. A centralized implementation is however also possible for less frequent use cases, for example, network self-configuration scenarios like cell identity management.

One option for the implementation of CME 410 and DAE 412 is to integrate and implement the corresponding functionality into one single function. This is possible in case it makes sense to implement both CME 410 and DAE 412 functionality either distributed or centralized.

As such, as shown in block 520 of FIG. 5, an apparatus, such as a Decision Action Engine 412, an apparatus 20 embodied by the computing device 10, or the like may be configured to match the current abstract state (for example, the environment and operational context as derived by the EMA engine) to the appropriate network configuration selected from the set of legal/acceptable candidate network configurations. The apparatus such as a Decision Action Engine 412, an apparatus 20 embodied by the computing device 10, or the like may therefore include means, such as the processor 22, the communication interface 26 or the like, for matching the current abstract state (environment and operational context as derived by the EMA engine) to the appropriate network configuration selected from the set of legal/acceptable candidate network configurations. In some embodiments, the DAE engine may be configured to learn the quality of different network configurations in different contexts, for example, as defined by the EMA, from the application of the different legal network configurations and towards different operator objectives, and subsequently, select the optimal network configuration for the different network contexts and states.

Coordination Engine (CE)

According to some example embodiments, a Coordination Engine (CE) 408 may be configured to (1) learn the effects of different CF decisions on other CFs; (2) interpret the learned knowledge; and (3) suggest modifications to the CME and DAE on how to minimize these effects.

CE 408 may request CME 410 to re-optimize the legal configurations list but may also directly grade the DAE 412 actions to enable the DAE 412 to learn configurations that have minimal effects on other CFs.

If distributed (for example, implemented as part of the CF), CE 408 may be an agent in a Multi-Agent System (MAS) of learning agents. Each agent learns if and how much the actions of its associated DAE 412 affect other CFs or CF instances. It then appropriately instructs the DAE 412 to act in a way that minimizes the negative effects. For this, the CE 408 instances would have to communicate such effects with one another.

In a centralized CNM approach, the CE is also centralized to allow for a multi-CF view in aligning the behavior of the CFs.

As such, as shown in block 525 of FIG. 5, an apparatus, such as a Coordination Engine 408, an apparatus 20 embodied by the computing device 10, or the like may be configured to manage conflicts among multiple network automation entities. The apparatus such as a Coordination Engine 408, an apparatus 20 embodied by the computing device 10, or the like may therefore include means, such as the processor 22, the communication interface 26 or the like, for managing conflicts among multiple network automation entities.

Interfaces

The individual components of the CF can be glued together via a set of interfaces described below. FIG. 6 is a block diagram illustrating an exemplary embodiments showing the interfaces between component blocks of a given cognitive function.

According to some example embodiments, up to six (6) interfaces may be required with the respective descriptions given in the table shown in FIG. 7.

Interface C1 may be configured to provide a connection between, for example, NOM and one or more of CE, CME, and DAE. In some embodiments, C1 may provide the KPI targets expected to be achieved by the CFs. Beyond just a specification of target values, it may include additional information that relates to how the targets are to be interpreted. Such could include weights, priorities or utilities of the different KPIs which help to distinguish between their respective relevance. A generic/universal structure of the KPI targets may be provided or it could also be differentiated per recipient entity. For example, the CME and DAE may be provided only with targets specific to the CF while the CE is provided with the complete set of targets for all CFs. If the reverse is done (for example, all entities provided with the complete set of targets), then each entity may be configured to filter out the targets that are relevant to its function.

Interface C2 may be configured to provide a connection between, for example, EMA and one or more of CE, CME, and DAE. In some embodiments, C2 may provide the abstract environment states or contexts as created by the EMA. Again these could be specified as generic or specific to each CF. In some embodiments, the recipient entities per CF may have a unified view of the environment and that make reference to the same contexts in their learning, decisions and reporting. The recipient entities can also specify the level of abstraction of the environment states that they require for their operation, for example, ranging from raw measurements and context, to network KPIs, and to more abstract environment descriptions.

Interface C3 may be configured to provide a connection between, for example, CE and CME. In some embodiments, C3 may provide the CE's configuration or report for a specific CF. In the simplest form, it provides reports that describe the effects of a given CF's actions on other CFs. If so, the CME then uses such a report to decide how to configure the set of legal candidate network configurations of a CF in a way that maximizes the global utility of outcomes (for example, realizing specified KPI targets). A more complex C3 may however include the CE's recommendations to be considered or decisions to be implemented by the CME. Such could, for example, be that a particular action/network configuration should never be used again.

Interface C4 may be configured to provide a connection between, for example, CE and DAE. In some embodiments, C4 may provide the CME configuration of the CF's action space (for example, set of legal network configurations). If the configurations database is part of the DAE (as shown in FIG. 6), such configurations are sent to the DAE. Otherwise, the CME may independently edit the standalone database that is then referenced by the DAE.

Interface C5 may be configured to provide a connection between, for example, DAE and EMA. In some embodiments, C5 is an optional interface to carry the current network configurations as selected by the DAE. In some embodiments, C5 may be needed s only if the EMA includes current configurations in its abstract descriptions of the environment, otherwise there would be no need for such a report.

Interface C6 may be configured to provide a connection between, for example, DEA and one or more of CE and CME. In some embodiments, C6 may carry the KPI report (for example, the mapping between NCP configurations and the corresponding effects in the network KPIs) that follows the DAE's action(s). Essentially, since the CME and CE need to evaluate how good certain actions are for the CF at hand, they need to get a report of the quality of the action(s) in particular contexts.

Note that the above description of the interfaces between the CF component blocks is one possible implementation. For example, another possible implementation could be that the mapping between NCP configurations and the corresponding effects in the network KPIs, as described within the C6 description, takes place within the EMA, under the precondition that the C5 interface also carries information about the timing of NCP configurations towards the EMA. In this case, the implementation of the C6 interface could be omitted.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A system for enabling cognitive network management (CNM) in radio access networks, the system comprising:
    a network objective manager (NOM);
    an environment modelling and abstraction (EMA) engine;
    a configuration management engine (CME); and
    a decision and action engine (DAE);
    the NOM comprising at least one processor and at least one memory including computer program code, the at least one memory and the computer program code configured to, with the processor, cause the network objective manager to:
        interpret one or more operator goals for the CNM or for a specific cognitive function (CF) to ensure that the CNM or the specific CF adjusts its behavior in order to fulfil the operator goals;
    the EMA engine comprising at least one processor and at least one memory including computer program code, the at least one memory and the computer program code configured to, with the processor, cause the environment modelling and abstraction engine to:
        abstract an environment into states configured for use in subsequent decision making, wherein the abstracted environment represent are built from one or more of a combination of quantitative key performance indicators (KPIs), abstract state labels, and operational contexts;
    the CME comprising at least one processor and at least one memory including computer program code, the at least one memory and the computer program code configured to, with the processor, cause the environment modelling and abstraction engine to:
        define one or more legal candidate network configurations for different contexts of the CF based on the abstracted environments and operational contexts as derived by the EMA engine;
    the DAE comprising at least one processor and at least one memory including computer program code, the at least one memory and the computer program code configured to, with the processor, cause the decision and action engine to:
        match a current abstract state, abstracted environment, operational context, or combination thereof as derived by the EMA engine to an appropriate network configuration selected from the set of legal candidate network configurations.

2. The system according to claim 1, further comprising:
    a coordination engine, the coordination engine comprising at least one processor and at least one memory including computer program code, the at least one memory and the computer program code configured to, with the processor, cause the coordination engine to:
        learn one or more effects of different CF decisions on other CFs;
        interpret the learned knowledge; and
        suggest modifications to the CME and DAE to minimize the one or more effects.

3. The system according to claim 1, wherein the NOM further comprises computer program code configured to, with the processor, cause the apparatus to:
    receive one or more key quality indicators (KQI) inputs; and
    provide weighted or prioritized KPI targets.

4. The system according to claim 1, wherein the EMA engine is implemented as a classifier configured to cluster KPIs or combinations of KPIs into sets that are logically distinguishable from each other.

5. The system according to claim 1, wherein the CME is implemented as a supervised learning agent applying a Neural Network, a Support Vector Machine, or other learning algorithm that evaluates historical data indicative of a quality of different configurations in terms of achieving the defined KPI targets in different contexts to select the legal configurations.

6. The system according to claim 1, wherein the DAE further comprises computer program code configured to, with the processor, cause the apparatus to:
    learn a quality of different network configurations in different contexts as defined by the EMA, from an application of the legal network configurations and towards different operator objectives, and subsequently, select an optimal network configuration for the network context and state.

7. The system according to claim 1, wherein the DAE is implemented as a single objective RL agent, wherein the single objective is optimizing the CF requirements, the CF requirements comprising one or more targets for different technical objectives or KPIs.

8. The system according to claim 1, wherein the system further comprises a first interface, the first interface configured provide the KPI targets expected to be achieved by the CFs and additional information indicative of how the targets are to be interpreted, the additional information comprising one or more of weights, priorities or utilities of the KPIs.

9. The system according to claim 1, wherein the system further comprises a second interface, the second interface configured to provide a connection between the EMA and one or more of the CE, the CME, and the DAE; and provide the abstract environment states or contexts as created by the EMA.

10. The system according to claim 1, wherein the system further comprises a third interface, the third interface configured to provide a connection between the CE and the CME; and provide rules derived by the CE concerning the configuration of a specific CF.

11. The system according to claim 1, wherein the system further comprises a fourth interface, the fourth interface configured to provide a connection between the CE and the DAE; and provide the set of legal network configurations.

12. The system according to claim 1, wherein the system further comprises a fifth interface, the fifth interface configured to provide a connection between the DAE and the EMA; and carry the current network configurations as selected by the DAE.

13. The system according to claim 1, wherein the system further comprises a fifth interface, the fifth interface configured to provide a connection between the DAE and one or more of the CME and the CE, and carry the report of current network configurations and related KPI measurements.

14. A method for enabling cognitive network management (CNM) in radio access networks, the method comprising:
utilizing a network objective manager (NOM), an environment modelling and abstraction (EMA) engine, a configuration management engine (CME), and
a decision and action engine (DAE);
interpreting, by the NOM, one or more operator goals for the CNM or for a specific cognitive function (CF) to ensure that the CNM or the specific CF adjusts its behavior in order to fulfil the operator goals;
abstracting, by the EMA engine, an environment into states configured for use in subsequent decision making, wherein the abstracted environment represent are built from one or more of a combination of quantitative key performance indicators (KPIs), abstract state labels, and operational contexts;
defining, by the CME, one or more legal candidate network configurations for different contexts of the CF based on the abstracted environments and operational contexts as derived by the EMA engine;
matching, by the DAE, a current abstract state, abstracted environment, operational context, or combination thereof as derived by the EMA engine to an appropriate network configuration selected from the set of legal candidate network configurations.

15. The method according to claim 14, further comprising:
utilizing a coordination engine;
learning, by the coordination engine, one or more effects of different CF decisions on other CF s;
interpreting the learned knowledge; and
suggesting modifications to the CME and DAE to minimize the one or more effects.

16. The method according to claim 14, further comprising:
receiving, at the NOM, one or more key quality indicators (KQI) inputs; and
providing, by the NOM, weighted or prioritized KPI targets.

17. The method according to claim 14, wherein the EMA engine is implemented as a classifier configured to cluster KPIs or combinations of KPIs into sets that are logically distinguishable from each other.

18. The method according to claim 14, wherein the CME is implemented as a supervised learning agent applying a Neural Network, a Support Vector Machine, or other learning algorithm that evaluates historical data indicative of a quality of different configurations in terms of achieving the defined KPI targets in different contexts to select the legal configurations.

19. The method according to claim 14, further comprising:
learning, by the DAE, a quality of different network configurations in different contexts as defined by the EMA, from an application of the legal network configurations and towards different operator objectives, and subsequently, select an optimal network configuration for the network context and state.

20. A computer program product for enabling cognitive network management (CNM) in radio access networks, computer program product comprising at least one non-transitory computer-readable storage medium having computer-executable program code instructions stored therein, the computer-executable program code instructions comprising program code instructions for:
utilizing a network objective manager (NOM), an environment modelling and abstraction (EMA) engine, a configuration management engine (CME), and
a decision and action engine (DAE);
interpreting, by the NOM, one or more operator goals for the CNM or for a specific cognitive function (CF) to ensure that the CNM or the specific CF adjusts its behavior in order to fulfil the operator goals;
abstracting, by the EMA engine, an environment into states configured for use in subsequent decision making, wherein the abstracted environment represent are built from one or more of a combination of quantitative key performance indicators (KPIs), abstract state labels, and operational contexts;
defining, by the CME, one or more legal candidate network configurations for different contexts of the CF based on the abstracted environments and operational contexts as derived by the EMA engine;
matching, by the DAE, a current abstract state, abstracted environment, operational context, or combination thereof as derived by the EMA engine to an appropriate network configuration selected from the set of legal candidate network configurations.

* * * * *

UNITED STATES PATENT AND TRADEMARK OFFICE
CERTIFICATE OF CORRECTION

| | | |
|---|---|---|
| PATENT NO. | : 11,349,725 B2 | |
| APPLICATION NO. | : 16/329783 | |
| DATED | : May 31, 2022 | |
| INVENTOR(S) | : Stephen Mwanje et al. | |

It is certified that error appears in the above-identified patent and that said Letters Patent is hereby corrected as shown below:

In the Drawings

In sheet 3 of 6, FIG. 4, reference numeral 406, Line 2, delete "Abstractior" and insert -- Abstraction --, therefor.

In sheet 6 of 6, FIG. 7, Line 6, delete "configurstion" and insert -- configuration --, therefor.

In the Claims

In Column 23, Line 46, Claim 15, delete "CF s;" and insert -- CFs; --, therefor.

Signed and Sealed this
Thirtieth Day of May, 2023

Katherine Kelly Vidal
*Director of the United States Patent and Trademark Office*